US012607965B2

(12) United States Patent
Bachmann et al.

(10) Patent No.: US 12,607,965 B2

(45) Date of Patent: Apr. 21, 2026

(54) HOROLOGICAL MOVEMENT COMPRISING A DISPLAY CORRECTION MECHANISM

(71) Applicant: ETA SA Manufacture Horlogère Suisse, Grenchen (CH)

(72) Inventors: Stéphane Bachmann, Bueren an der Aare (CH); David Philippon, Saint-Imier (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 315 days.

(21) Appl. No.: 18/515,443

(22) Filed: Nov. 21, 2023

(65) Prior Publication Data

US 2024/0176301 A1 May 30, 2024

(30) Foreign Application Priority Data

Nov. 24, 2022 (EP) .................................... 22209465

(51) Int. Cl.
*G04B 27/02* (2006.01)
*G04B 3/04* (2006.01)

(52) U.S. Cl.
CPC ........... *G04B 27/023* (2013.01); *G04B 3/041* (2013.01)

(58) Field of Classification Search
CPC ........ G04B 3/041; G04B 27/00; G04B 27/02; G04B 27/023
See application file for complete search history.

(56) References Cited

U.S. PATENT DOCUMENTS 3,470,687 A 10/1969 Tsuneyoshi et al.
3,798,893 A 3/1974 Ippoushi
(Continued)

FOREIGN PATENT DOCUMENTS

EP 3 144 743 A1 3/2017
FR 2 169 861 A1 9/1973
(Continued)

OTHER PUBLICATIONS

Office Action issued Jul. 23, 2024, in corresponding Japanese Patent Application No. 2023-134547, 3 pages.
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A horological movement including a setting stem, a movement winding mechanism, a date display mechanism, a time display mechanism, and a first lever carrying a drive wheel capable of being kinematically connected to the setting stem, and carrying at least one hand-setting wheel to cooperate with the time display mechanism and capable of being kinematically connected to the drive wheel, and a second lever carrying a date correction mechanism capable of being kinematically connected to the drive wheel as well as to the date display mechanism, the second lever being pivotably mounted on the first lever and arranged to move between a meshed position in which the date correction mechanism cooperates with the date display mechanism and a retracted position in which the date correction mechanism is disconnected from the date display mechanism, and the setting stem and the first lever and second lever are arranged to occupy three positions.

10 Claims, 8 Drawing Sheets

(56) References Cited

U.S. PATENT DOCUMENTS

| | | | | |
|---|---|---|---|---|
| 3,838,567 | A * | 10/1974 | Giger | G04B 11/006<br>968/83 |
| 7,823,476 | B2 * | 11/2010 | Chaignat | G04B 27/04<br>368/146 |
| 7,957,226 | B2 * | 6/2011 | Chaignat | G04B 13/027<br>368/185 |
| 9,785,115 | B2 * | 10/2017 | Philippon | G04B 3/003 |
| 11,372,370 | B2 * | 6/2022 | Peter | G04B 1/14 |
| 11,550,267 | B2 * | 1/2023 | Wagnière | G04B 13/002 |
| 2008/0245171 | A1 * | 10/2008 | Chaignat | F16H 1/003<br>74/434 |
| 2017/0075304 | A1 | 3/2017 | Philippon et al. | |

FOREIGN PATENT DOCUMENTS

| | | | |
|---|---|---|---|
| FR | 2 283 477 | A1 | 3/1976 |
| JP | 48-73172 | | 10/1973 |
| JP | 2-128983 | U | 10/1980 |

OTHER PUBLICATIONS

European Search Report issued Apr. 12, 2023 in European Application 22209465.8 filed on Nov. 24, 2022, 3 pages (with English Translation of Categories of Cited Documents).

* cited by examiner

HOROLOGICAL MOVEMENT COMPRISING A DISPLAY CORRECTION MECHANISM

CROSS-REFERENCE TO RELATED APPLICATION

This application claims priority to European Patent Application No. 22209465.8 filed on Nov. 24, 2022, the entire disclosure of which is hereby incorporated herein by reference.

TECHNICAL FIELD OF THE INVENTION

The invention relates to the field of mechanical watchmaking. More particularly, it concerns a horological movement comprising a setting stem, a movement winding mechanism, a date display mechanism and a time display mechanism.

More particularly, the invention concerns a time and/or date correction mechanism.

TECHNOLOGICAL BACKGROUND OF THE INVENTION

Many mechanical watches conventionally comprise a setting stem, located at 3 o'clock, which can occupy two positions, namely a manual winding position and a hand-setting position. These watches may further comprise a date correction mechanism actuated via the same setting stem.

Patent EP 2 707 778 describes a mechanism for correcting the date by means of the setting stem, which is arranged to occupy a third position. However, in this mechanism, the date corrector member is fixed and therefore in permanent mesh with the date ring, and date correction takes place in both directions. There is a risk of breaking a date drive arm if the user corrects the date around midnight.

Patent EP 3 144 743 further describes a horological movement comprising a first lever carrying a first drive wheel capable of being kinematically connected to the setting stem, a second lever carrying a second hand-setting wheel arranged to cooperate with the time display mechanism and capable of being kinematically connected to the first drive wheel, and a third lever carrying a date correction mechanism capable of being kinematically connected to the first drive wheel as well as to the date display mechanism, the third lever being pivotably mounted on the second lever and arranged to move between a meshed position in which the date correction mechanism cooperates with the date display mechanism and a retracted position in which the date correction mechanism is disconnected from the date display mechanism, and the setting stem and the first and second levers are arranged to occupy three positions.

However, in this mechanism, when correcting the time, the wearer also modifies the date. An unintentional modification of the date is not necessarily desired by the wearer, who must then correct the date after having corrected the time.

SUMMARY OF THE INVENTION

In particular, the invention aims to overcome the various drawbacks of known mechanisms.

More specifically, one aim of the invention is to provide a horological movement that allows the time or date to be corrected by the setting stem quickly.

To this end, the present invention relates to a horological movement comprising a setting stem, a movement winding mechanism, a date display mechanism and a time display mechanism, the horological movement comprising a first lever carrying a drive wheel capable of being kinematically connected to the setting stem, and carrying at least one hand-setting wheel arranged to cooperate with the time display mechanism and capable of being kinematically connected to the drive wheel, and a second lever carrying a date correction mechanism capable of being kinematically connected to the drive wheel and to the date display mechanism, the second lever being pivotably mounted on the first lever and arranged to move between a meshed position in which the date correction mechanism cooperates with the date display mechanism and a retracted position in which the date correction mechanism is disconnected from the date display mechanism, and in that the setting stem and the first and second levers are arranged to occupy three positions:

- a winding position, in which the setting stem is kinematically connected to the movement winding mechanism and is not kinematically connected to the drive wheel,
- a date correction position in which the setting stem is kinematically connected to the drive wheel, and the first and second levers are positioned so that the first drive wheel is kinematically connected to the date correction mechanism and is not kinematically connected to the time display mechanism;
- and a hand-setting position in which the setting stem is kinematically connected to the first drive wheel and the first and second levers are positioned so that the first drive wheel is kinematically connected to the time display mechanism via the at least one hand-setting wheel and is not kinematically connected to the date correction mechanism.

According to the invention, the horological movement comprises a third lever arranged to cooperate with the second lever, the third lever being arranged to block the second lever in the hand-setting position when the setting stem is in the hand-setting position and to prevent the date from being corrected while the time is being corrected.

In accordance with other advantageous variants of the invention:

- the second lever comprises means for limiting the angular stroke;
- the means for limiting the angular stroke comprise an aperture formed in the second lever, the aperture being arranged to cooperate with a pin, the ends of the aperture defining the stroke length of the second lever;
- the horological movement comprises a winding pinion, a sliding pinion, the positioning of the sliding pinion being ensured by a pull-out piece and a lever, the third lever comprising a bent guide groove which defines the angular position of the third lever according to the position in which the pull-out piece is immobilised;
- the third lever cooperates indirectly with a jumper via the pull-out piece, the jumper comprising a flexible arm having three notches forming three positions corresponding to the winding, date correction and time correction positions;
- the third lever has a first free end on which is mounted a pin arranged to rest against the second lever when the winding stem is in the hand-setting position, and a second end comprising the guide groove cooperating with a pin secured to the pull-out piece;
- the pin is arranged in the guide groove to cause the third lever to tilt from its rest position into its hand-setting position, so as to block the displacement of the second lever at least towards the date display mechanism, or to block the second lever entirely;

the second lever comprises friction means;

the friction means take the form of a washer.

The invention further relates to a timepiece comprising a movement in accordance with the invention.

BRIEF DESCRIPTION OF THE FIGURES

Further features and advantages of the invention will become apparent from the following detailed description, given by way of a non-limiting example, with reference to the accompanying drawings in which.

DETAILED DESCRIPTION OF THE INVENTION

Figure 3:
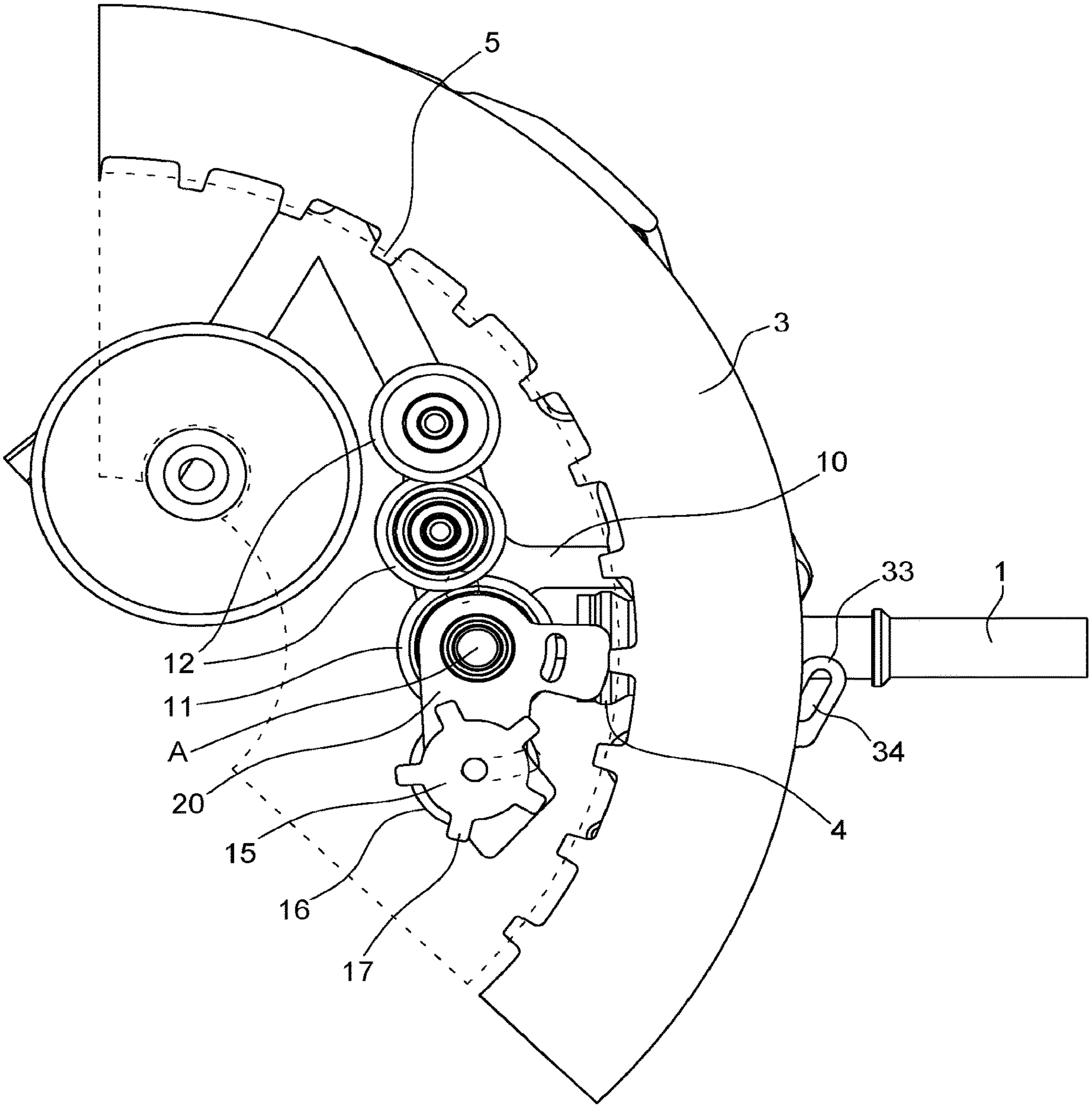
FIG. 3 shows a partial top view of a horological movement according to the invention.

FIG. 3 shows part of a horological movement comprising in particular a setting stem 1, a winding mechanism, a date correction mechanism and a time correction mechanism.

In a conventional manner, the setting stem 1 or winding stem can be actuated from outside the watch case and is capable of rotating about its axis of revolution C on the one hand, and of translating along its axis of revolution C on the other hand, in order to occupy its various positions. A winding pinion 2 and a sliding pinion 4 are also provided, the sliding pinion 4 being positioned by a pull-out piece 6 and a lever 8.

Figure 1:
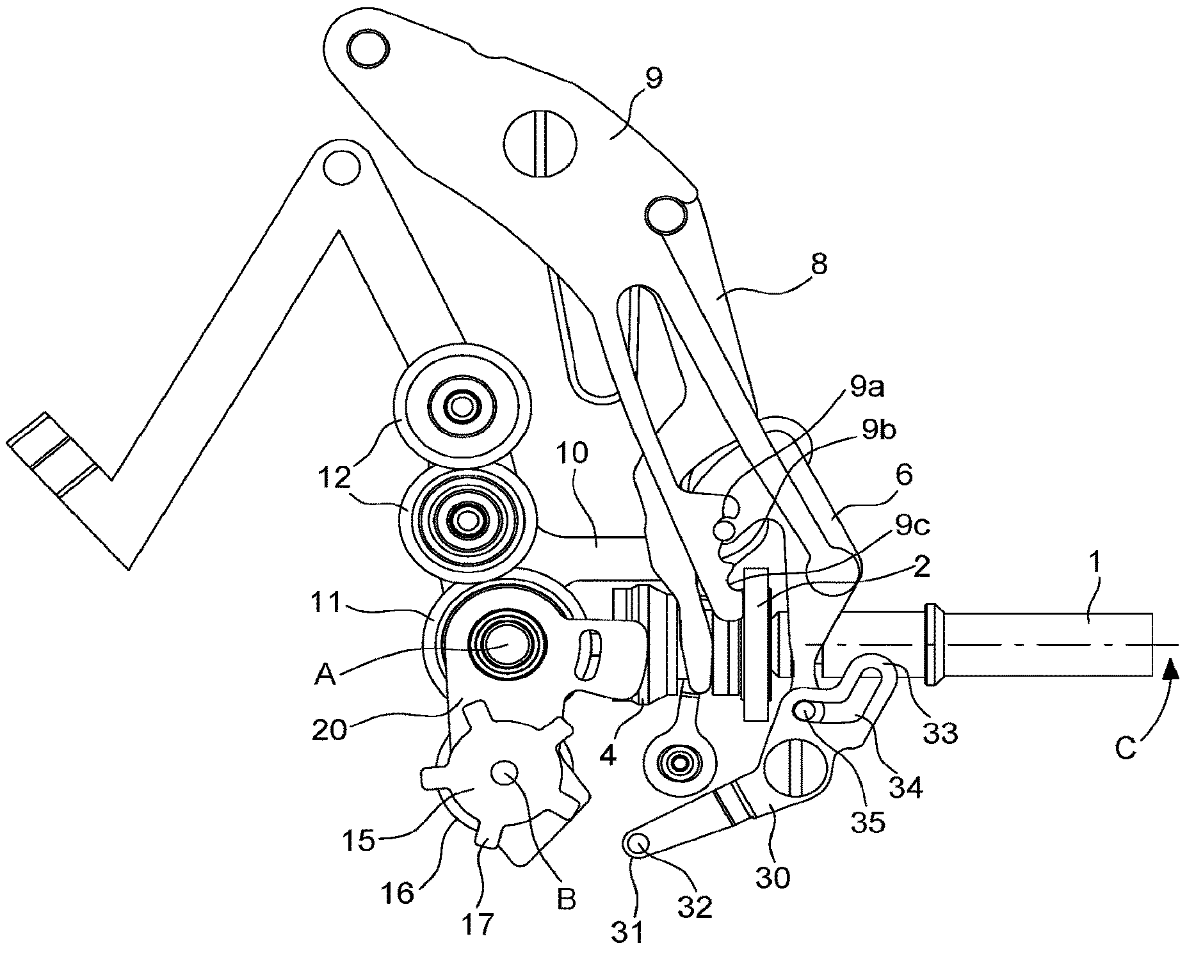
FIG. 1 shows a perspective top view of a movement correction mechanism according to the invention.
Figure 2:
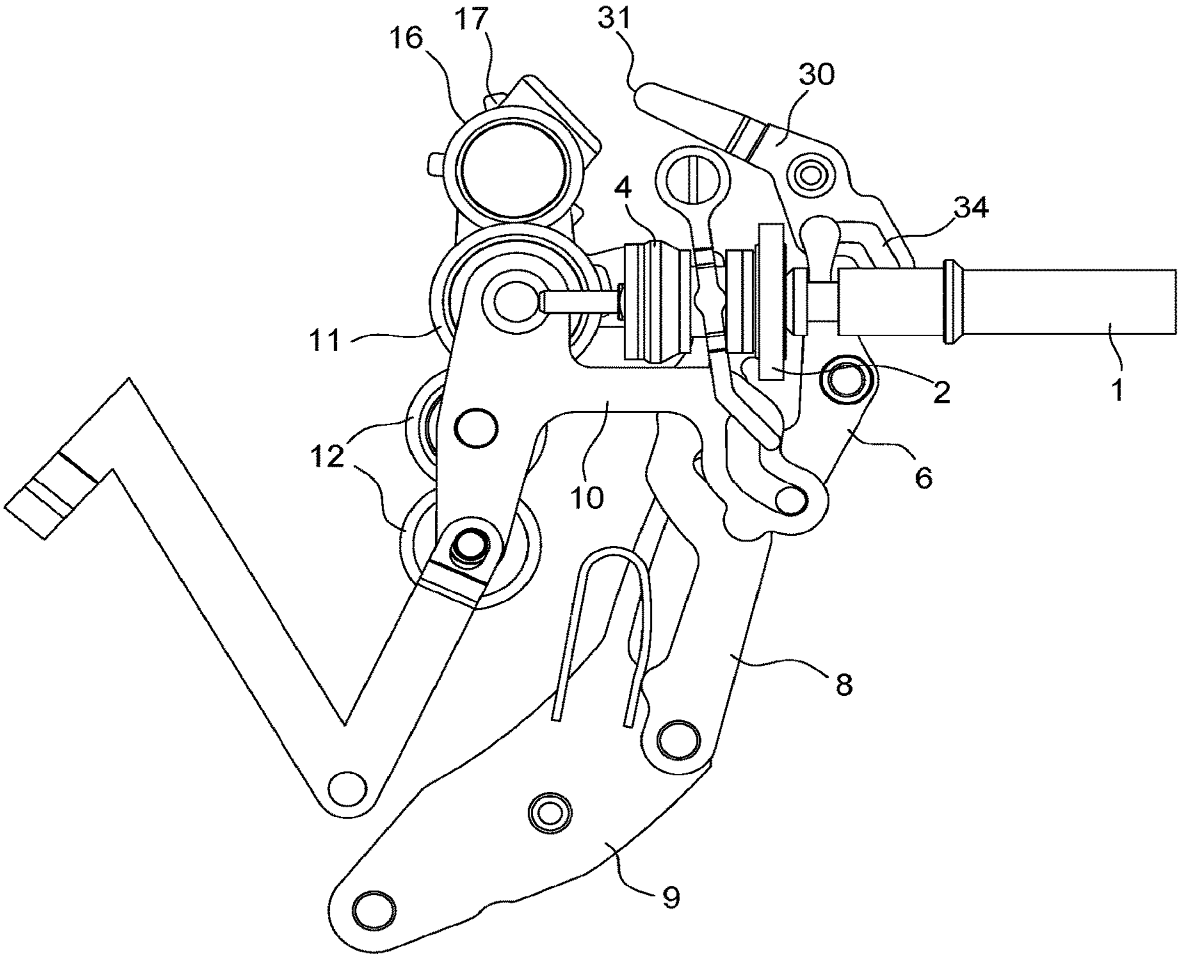
FIG. 2 shows a perspective bottom view of a movement correction mechanism according to the invention.

In a conventional manner, the winding pinion 2 meshes with the winding mechanism (not shown) to manually wind the movement when the setting stem is in its winding position (generally in its non-pulled out position) and the sliding pinion 4 cooperates with the winding pinion 2, as shown in FIG. 1.

The date display mechanism conventionally comprises a date disc or date ring 3 having an internal toothing 5 that can be actuated by a date correction mechanism.

The time correction mechanism can comprise a set of intermediate wheels meshing with a minute-wheel that cooperates with a cannon-pinion.

All these elements and their operation are known to a person skilled in the art and require no further description.

According to the invention, a first lever 10 is pivotably mounted on a plate and carries a first drive wheel 11 mounted to rotate freely about an axis. The drive wheel 11 can be meshed by the sliding pinion 4 of the setting stem 1 when the setting stem is in the date correction or hand-setting position (pulled-out positions).

Figure 5:
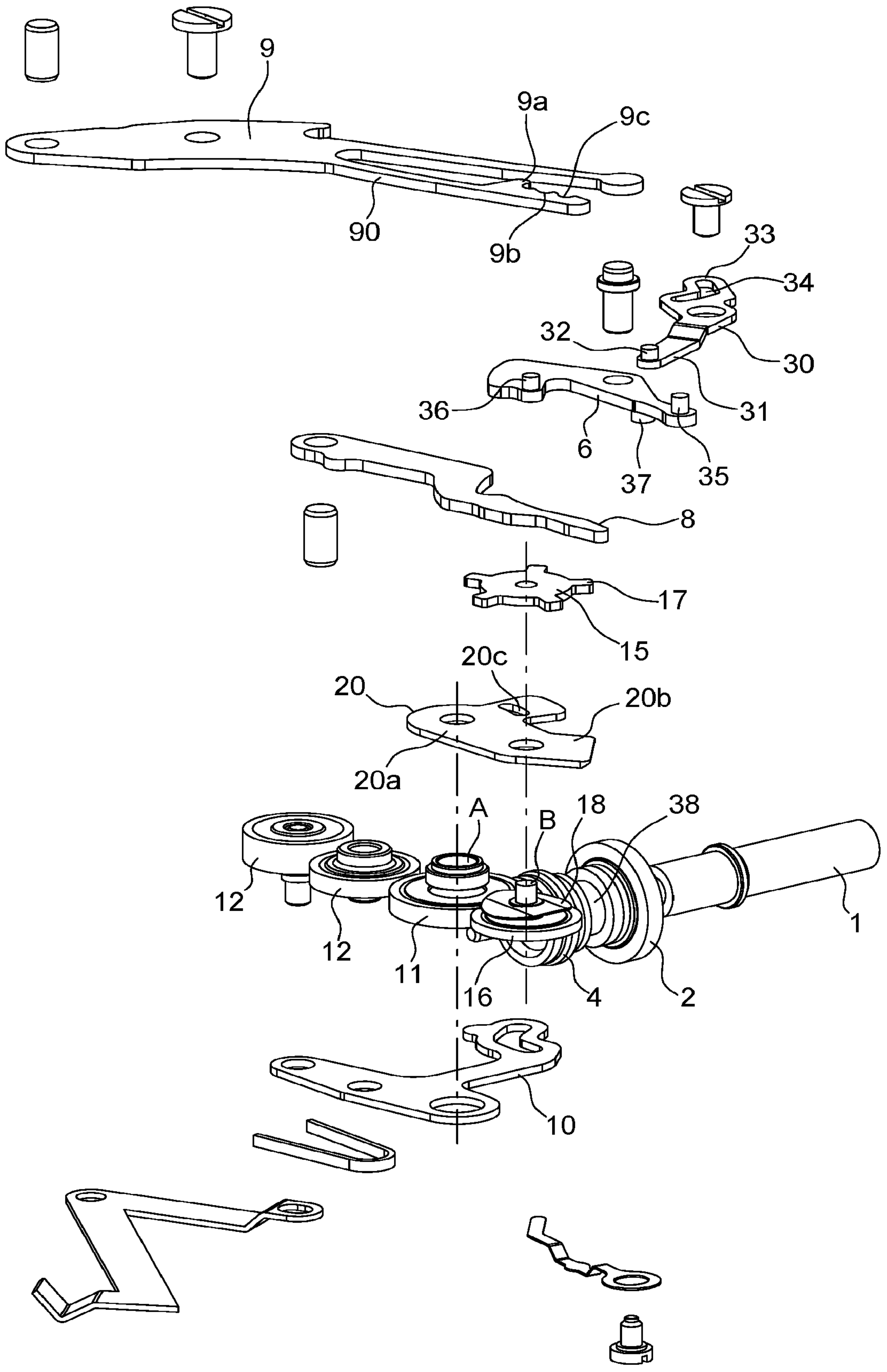
FIG. 5 is an exploded view of a correction mechanism of a horological movement according to the invention.

A second lever 20 is also provided, pivotably mounted on the first lever 10. With reference to FIG. 5, the second lever 20 comprises a first portion 20*a* provided with a first hole for the passage of a first shaft A, constituting the pivot axis of the second lever 20 on the first lever 10. The second lever 20 also comprises a second portion 20*b* with a second hole for the passage of a second shaft B, constituting the pivot axis of the date correction means.

The second lever 20 carries a date correction mechanism that can be kinematically connected to the drive wheel 11 and to the date ring 3. With particular reference to FIG. 3, the date correction mechanism comprises a corrector member 15 capable of being kinematically connected to the drive wheel 11 via a connecting pinion 16, the corrector member 15 comprising correction fingers 17 capable of cooperating with the toothing 5 of the date ring 3. The corrector member 15 is friction-mounted via a friction washer 18 on the second lever 20 by means of the shaft B secured to the corrector member 15. The corrector member 15 and the connecting pinion 16 are secured to one another, the whole being mounted such that it can rotate on the second lever 20.

In the example shown, the correction fingers 17 cooperate directly with the date disc 3, but it is clear that gear trains or other intermediate mechanisms can be provided between the corrector member 15 and the date display mechanism.

The second lever 20 is pivotably mounted on the first lever 10 and is arranged to move between a meshed position in which the date correction mechanism cooperates with the date ring 3 and a retracted position in which the date correction mechanism is disconnected from the date ring 3.

The second lever 20 further comprises a stop element, the stop element being in the form of an aperture 20*c* so that the second lever travels between the two stops defined by the ends of the aperture 20*c*, the ends of the aperture 20*c* thus making it possible to delimit the angular stroke of the second lever 20 and to define two separate positions for the second lever 20.

In addition, a peg (not shown in the figures) is provided on the plate, which peg is arranged to cooperate with the aperture 20*c* in the second lever 20. In cooperation with the aperture 20*c*, the peg forms a means for limiting the stroke of the second lever 20 when the latter is pivoting. Thus, the meshed position between the corrector and the date ring is defined by the first end of the aperture, when it comes into contact with the peg.

Contact between the peg and the second end of the aperture defines the release position.

According to the invention, a third lever 30 is pivotably mounted on the plate and carries a guide groove 34 arranged to cooperate with the pull-out piece 6. The third lever 30 is arranged to cooperate with the second lever 20 and to block the latter when the winding stem is in the hand-setting position, thus preventing the date from being corrected when the time is corrected. As can be seen in FIG. 4*b*, the third lever has a first free end 31 on which is mounted a pin 32 arranged to rest against the second lever 20 when the winding stem 1 is in the hand-setting position, and a second end 33 comprising the guide groove 34 cooperating with a pin 35 secured to the pull-out piece 6.

The guide groove 34 is bent so as to define three angular positions of the lever corresponding to the winding, date correction and time correction positions of the setting stem 1. According to the invention, the lever 30 cooperates indirectly with a jumper 9 via the pull-out piece 6. The jumper 9 comprises a flexible arm 90 with three notches 9*a*, 9*b*, 9*c*.

The pull-out piece 6 comprises a pin 36 which cooperates with one of the notches 9*a*, 9*b*, 9*c* depending on the position of the stem. The pull-out piece 6 also cooperates with the winding stem 1 by means of a pin 37 arranged to rest in a groove 38 of the winding stem 1. Thus, when pulling on the winding stem 1, the pull-out piece 6 pivots and pushes the flexible arm 90, and the pin 36 moves inside one of the notches 9*a*, 9*b*, 9*c* depending on the position occupied by the winding stem 1. Such an arrangement in particular allows "notches" to be created for the different positions of the winding stem 1 and thus makes it easier for the wearer to identify the position of the winding stem 1 when looking to make a correction.

Figure 4A:
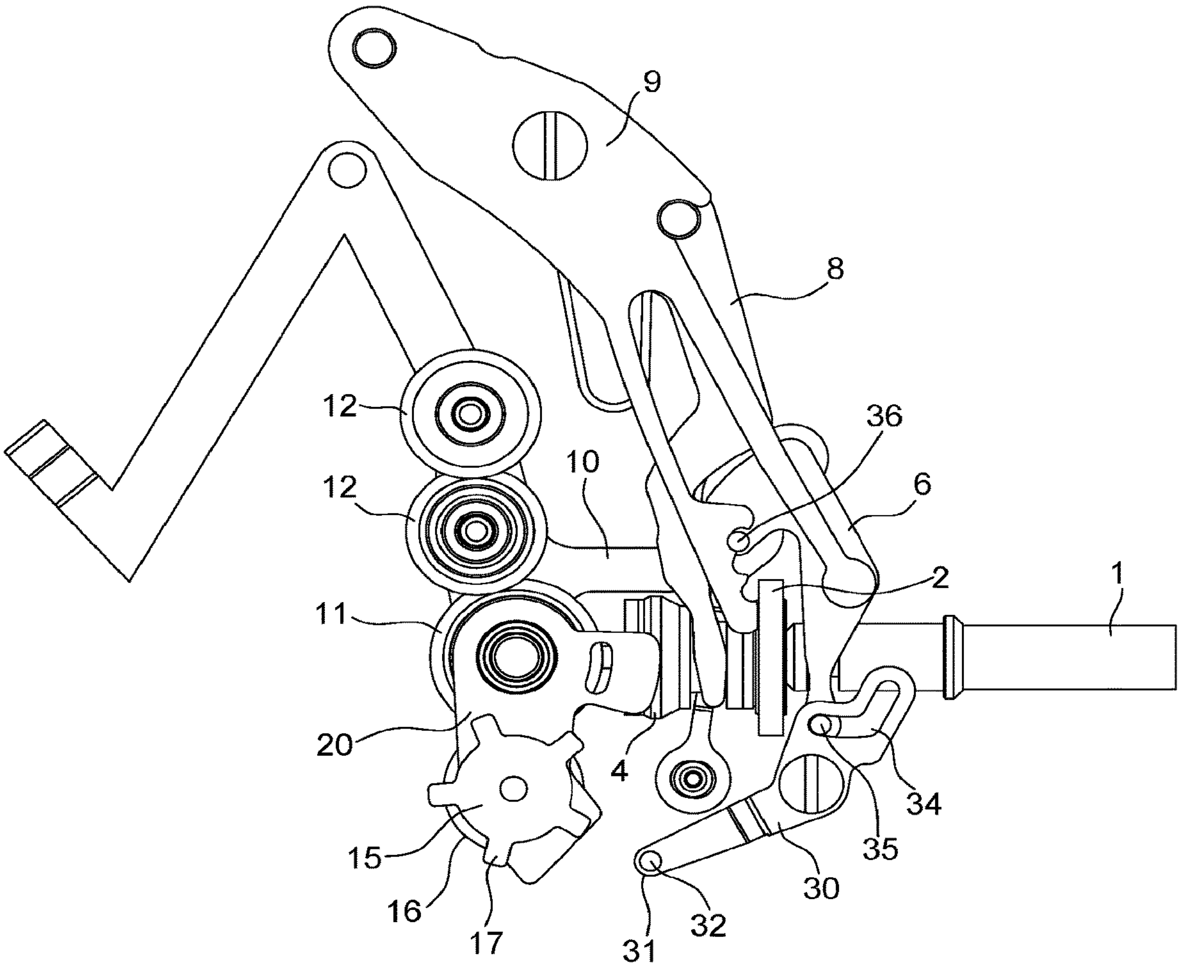
FIGS. 4*a* to 4*d* show top views of a correction mechanism of a horological movement according to the invention, which correction mechanism is shown in different positions.
Figure 4B:
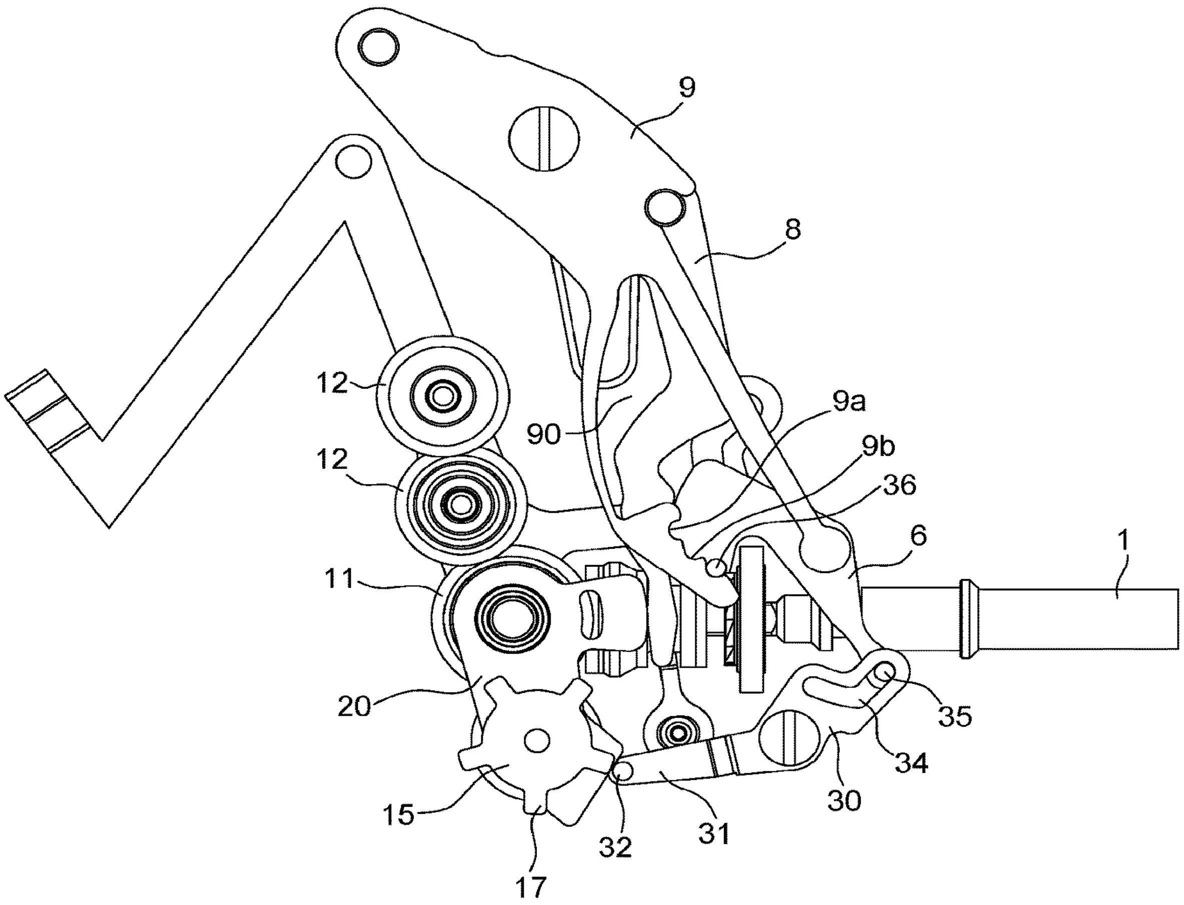

The movement according to the invention operates as follows: in the manual winding position, as shown in FIG. 4*a*, the sliding pinion 4 meshes with the winding pinion 2, which meshes with the winding mechanism (not shown) to manually wind the movement. Thus, the setting stem 1 in its winding position is kinematically connected to the movement winding mechanism and is not kinematically connected to the drive wheel 11, nor consequently to the other time or date correction mechanisms.

Figure 4C:
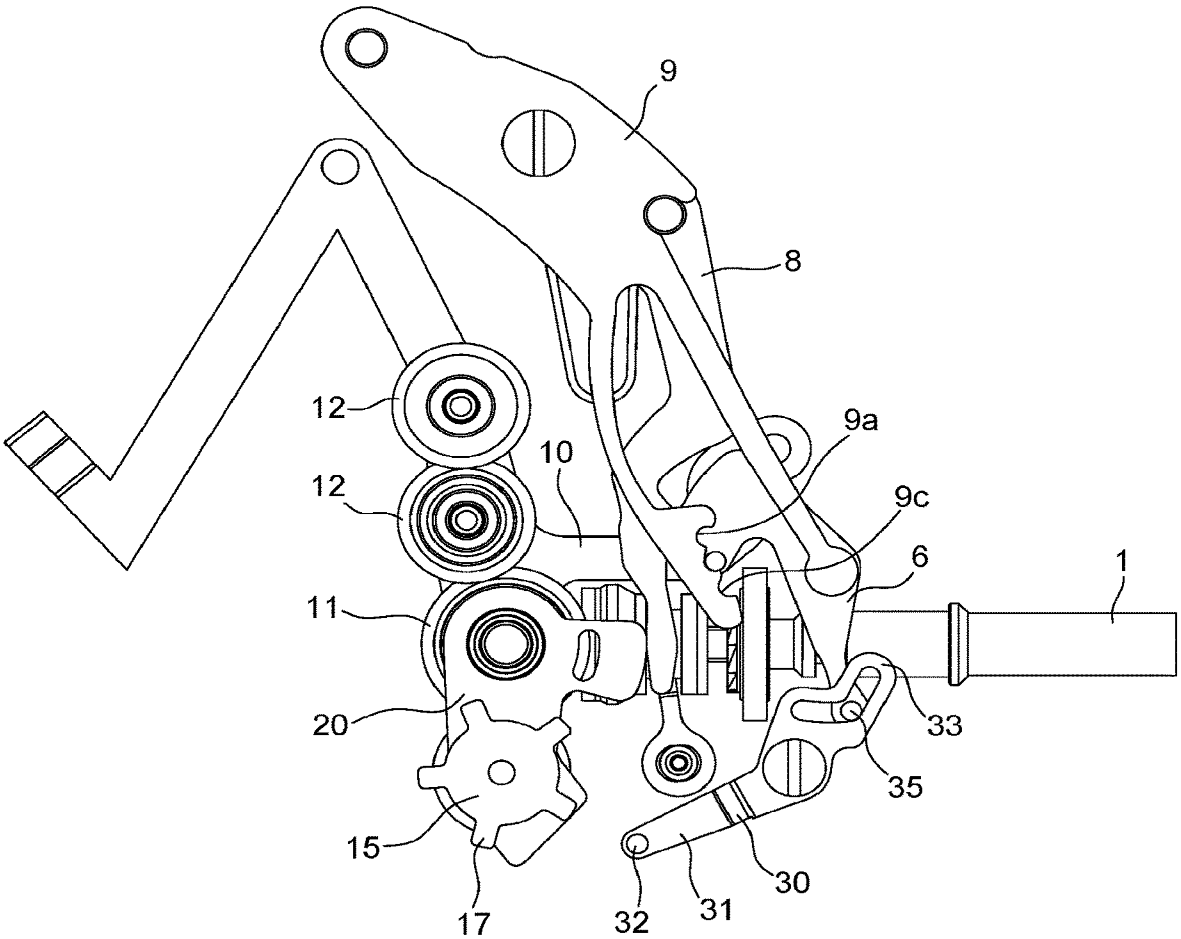
Figure 4D:
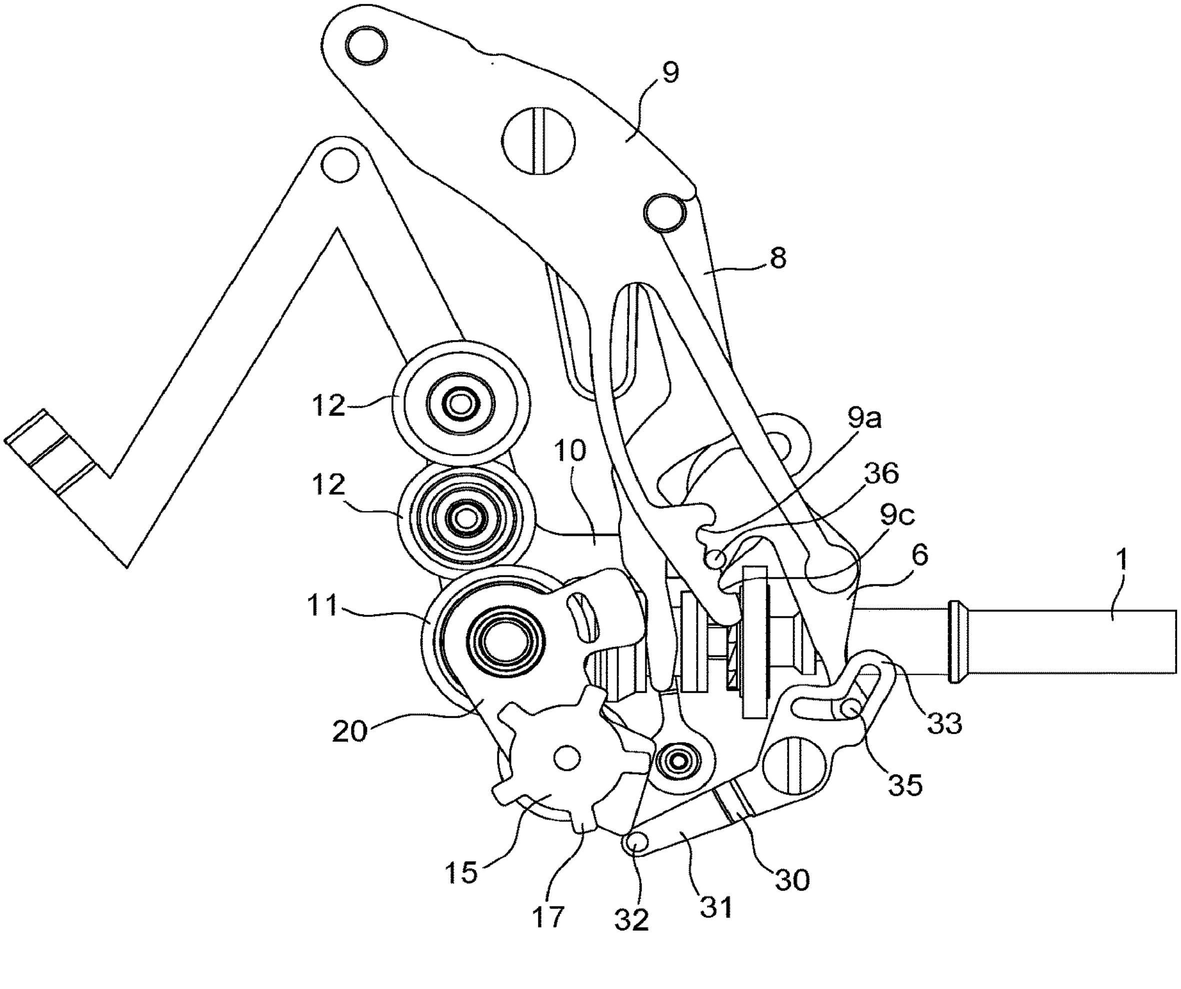

With reference to FIG. 4*d*, when the setting stem 1 is pulled into its date correction position, the sliding pinion 4 translates towards the drive wheel 11 and meshes therewith. The third lever 30 is also displaced when the setting stem 1 is pulled out, allowing the second lever 20 to pivot into the date correction position. In this date correction position, the setting stem 1 is thus kinematically connected to the drive wheel 11, and the first lever 10 and second lever 20 are positioned so that the first drive wheel 11 is kinematically connected to the date correction mechanism carried by the second lever 20 and is not kinematically connected to the minute-wheel. More specifically, the second lever 20 is positioned so that the drive wheel 11 meshes with the connecting pinion 16 carried by the second lever 20. The connecting pinion 16, secured to the corrector member 15, thus rotates the latter and the friction washer 18 so as to cause the second lever 20 to pivot, after which one of the correction fingers 17 cooperates with a tooth 5 on the date ring 3 and actuates the latter to correct the date. The first lever 10 is positioned so that the drive wheel 11 does not cooperate with the minute-wheel. In this way, the rapid date correction function is isolated from the hand-setting and winding functions.

In this position, rotation of the setting stem 1 in one direction causes the connecting pinion 16 and the friction washer 18 to rotate in one direction, and thus the second lever 20 to pivot in the same direction, this direction of pivoting, for example, bringing the corrector member 15 towards the date ring 5, as shown in FIG. 4*d*. The third lever 30 thus occupies its date correction position and the date can be corrected.

When the setting stem 1 is turned in the opposite direction, this causes the connecting pinion and the axis B to rotate in the opposite direction, and thus the second lever 20 to pivot in the same opposite direction, this opposite direction of pivoting moving the date correction mechanism away from the date ring 5, as shown in FIG. 4*c*. The movement of the date correction mechanism away from the date ring 5 is limited by the cooperation of the peg with the ends of the aperture 20*c* provided in the second lever 20. Thus, the mechanism according to the invention enables unidirectional correction of the date by means of the setting stem 1. The correction of another function can be envisaged when the setting stem is turned in the opposite direction.

With reference to FIG. 4*b*, when the setting stem 1 is pulled out into its hand-setting position, the sliding pinion 4 translates towards the first lever 10. The setting stem 1 thus cooperates with the first lever 10 to cause the latter to pivot so that the drive wheel 11 meshes with the hand-setting wheels 12, while the sliding pinion 4 remains meshed with the first drive wheel 11. In this hand-setting position, the setting stem 1 is thus kinematically connected to the drive wheel 11 and the first lever is positioned so that the first drive wheel 11 and the hand-setting wheels 12 enable the hands to be set. More specifically, when the setting stem 1 is translated, the pull-out piece acts on the third lever 30 and moves it into the position in which it blocks the second lever 20. The cooperation of the pin 35 in the guide groove 34 causes the third lever 30 to tilt from its rest position into its hand-setting position, so as to block the displacement of the second lever, at least in the direction of the date, or even to completely block the lever from being displaced in the direction of the date ring. In this way, the hand-setting function is isolated from the quick date correction and winding functions.

In the movement according to the invention, the meshing between the first drive wheel and the date display or hand-setting mechanisms is not permanent, so that the toothings of the various parts do not require specific cutting.

The invention further relates to a timepiece comprising a horological movement in accordance with the invention.

Of course, the present invention is not limited to the example shown and various alternatives and modifications that may be apparent to a person skilled in the art can be made thereto, without departing from the scope of the invention as defined by the claims.

The invention claimed is:

1. A horological movement comprising a setting stem, a movement winding mechanism, a date display mechanism and a time display mechanism, the horological movement comprising a first lever carrying a drive wheel capable of being kinematically connected to the setting stem, and carrying at least one hand-setting wheel arranged to cooperate with the time display mechanism and capable of being kinematically connected to the drive wheel, and a second lever carrying a date correction mechanism capable of being kinematically connected to the drive wheel and to the date display mechanism, the second lever being pivotably mounted on the first lever and arranged to move between a meshed position wherein the date correction mechanism cooperates with the date display mechanism and a retracted position wherein the date correction mechanism is disconnected from the date display mechanism, and wherein the setting stem and the first lever and second lever are arranged to occupy three positions:

a winding position, wherein the setting stem is kinematically connected to the movement winding mechanism and is not kinematically connected to the drive wheel, a date correction position wherein the setting stem is kinematically connected to the drive wheel, and the first lever and second lever are positioned so that the first drive wheel is kinematically connected to the date correction mechanism and is not kinematically connected to the time display mechanism, and a hand-setting position wherein the setting stem is kinematically connected to the first drive wheel and the first lever and second lever are positioned so that the first drive wheel is kinematically connected to the time display mechanism via the at least one hand-setting wheel and is not kinematically connected to the date correction mechanism, wherein the horological movement comprises a third lever arranged to cooperate with the second lever, the third lever being arranged to block the second lever in the hand-setting position when the setting stem is in the hand-setting position and to prevent the date from being corrected while the time is being corrected.

2. The horological movement according to claim 1, wherein the second lever comprises a device for limiting an angular stroke.

3. The horological movement according to claim 2, wherein the device for limiting the angular stroke comprise an aperture formed in the second lever, the aperture being arranged to cooperate with a pin, the ends of the aperture defining a length of the angular stroke of the second lever.

4. The horological movement according to claim 1, wherein the horological movement comprises a winding pinion, a sliding pinion, the positioning of the sliding pinion being ensured by a pull-out piece and a lever, the third lever comprising a bent guide groove which defines the angular position of the third lever according to the position wherein the pull-out piece is immobilised.

5. The horological movement according to claim 4, wherein the third lever cooperates indirectly with a jumper via the pull-out piece, the jumper comprising a flexible arm having three notches forming three positions corresponding to the winding, date correction and time correction positions.

6. The horological movement according to claim 4, wherein the third lever has a first free end on which is mounted a pin arranged to rest against the second lever when the winding stem is in the hand-setting position, and a second end comprising the guide groove cooperating with a pin secured to the pull-out piece.

7. The horological movement according to claim 6, wherein the pin is arranged in the guide groove to cause the third lever to tilt from its rest position into its hand-setting position, so as to block a displacement of the second lever at least towards the date display mechanism, or to block the second lever entirely.

8. The horological movement according to claim 1, wherein the second lever comprises a friction device.

9. The horological movement according to claim 8, wherein the friction device includes a washer.

10. A timepiece comprising a horological movement according to claim 1.

* * * * *